United States Patent [19]
Guenkel

[11] Patent Number: 4,966,276
[45] Date of Patent: Oct. 30, 1990

[54] PROCESSES FOR CONCENTRATING NITRIC ACID

[76] Inventor: Alfred A. Guenkel, Kfupm #846, Dhahran 312161, Saudi Arabia

[21] Appl. No.: 338,692

[22] Filed: Apr. 17, 1989

Related U.S. Application Data

[63] Continuation-in-part of Ser. No. 163,492, Feb. 22, 1988, abandoned.

[51] Int. Cl.$^5$ .................................... B01D 3/34
[52] U.S. Cl. .................... 203/13; 159/2.1; 159/47.1; 159/DIG. 19; 159/DIG. 22; 159/DIG. 23; 203/22; 203/27; 203/35; 203/78; 203/80; 203/88; 203/94; 203/98; 203/DIG. 8; 203/DIG. 9; 423/390
[58] Field of Search ............ 203/1, 13, 78, 22, 25, 203/35, 43, 27, 52, 94, 80, 88, 98, 99, DIG. 8, DIG. 9, DIG. 18, DIG. 19; 159/47.1, 2.1, DIG. 19, DIG. 23, DIG. 22, DIG. 16, 24.2; 423/390, 390 P

[56] References Cited

U.S. PATENT DOCUMENTS

| | | | |
|---|---|---|---|
| 864,217 | 8/1907 | Wolfenstein et al. | 203/13 |
| 1,031,864 | 7/1912 | Pauling | 203/13 |
| 1,074,287 | 9/1913 | Pauling | 203/13 |
| 1,772,123 | 8/1930 | Zeisberg | 203/13 |
| 1,895,012 | 1/1933 | Spangler | 203/13 |
| 1,895,492 | 1/1933 | Shapleigh | 203/13 |
| 1,922,289 | 8/1933 | Handforth | 423/390 P |
| 2,403,050 | 7/1946 | Chambers, Jr. et al. | 203/13 |
| 2,463,453 | 3/1949 | Beardsley | 203/13 |
| 2,860,035 | 11/1958 | Mandelik | 203/13 |
| 2,999,009 | 9/1961 | Bechtel et al. | 423/390 P |
| 3,106,515 | 10/1963 | Williams | 203/13 |
| 3,401,095 | 9/1968 | Saradzhev | 203/13 |
| 3,433,718 | 3/1969 | Yodis | 203/13 |
| 3,479,254 | 11/1969 | Miserlis | 203/13 |
| 4,344,827 | 8/1982 | Auge et al. | 203/13 |

FOREIGN PATENT DOCUMENTS

| | | | |
|---|---|---|---|
| 0657056 | 2/1963 | Canada | 203/13 |
| 0747821 | 12/1966 | Canada | 423/390 |
| 0292951 | 10/1929 | United Kingdom | 423/390 |
| 0407089 | 3/1934 | United Kingdom | 423/390 |
| 0817739 | 8/1959 | United Kingdom | 423/390 |

OTHER PUBLICATIONS

Dietrich Gericke, "Concentration of Nitric Acid by Sulphuric Acid", Schott, pp. 894–899.

Primary Examiner—Virginia Manoharan

[57] ABSTRACT

An integrated continuous processes for concentrating "weak" nitric acid and concurrently reconcentrating the spent dehydrating agent used to break the nitric acid azeotrope to obtain "strong" nitric acid, the processes involving direct coupling of the nitric acid concentration with the reconcentration of the spent dehydrating agent so that less energy input is required. The major proportion of the feed "weak" nitric acid is vaporized before being fed countercurrently into a column to contact a large volume of the dehydrating agent, this vaporization being one of the two major sources of energy input, the second being through the reboiler at the bottom of the column. Energy input is balanced by energy rejection through condensation of strong nitric acid vapor and water vapor. The nitric acid vapor injected into the lower part of the column is subsequently contacted in succession with a mixture of nitric acid and a portion of the dehydrating agent to further increase the strength of the nitric acid vapor, then with a third portion of the dehydrating agent and finally a small reflux of concentrated "strong" nitric acid to remove further water and residual dehydrating agent from the concentrated "strong" nitric acid vapor in the upper part of the column. The spent dehydrating agent is reconcentrated by flashing under vacuum or alternatively through evaporative cooling with air without further substantial energy input, and is recycled back to the nitric acid concentration column without being cooled, avoiding consequent rejection of energy. The preferred dehydrating agents are aqueous solutions of sulfuric acid and of magnesium nitrate.

20 Claims, 3 Drawing Sheets

PROCESSES FOR CONCENTRATING NITRIC ACID

CROSS REFERENCE TO RELATED APPLICATION

This application is a continuation in part of my application Ser. No. 07/163,492 filed Feb. 22 1988, now abandoned.

FIELD OF THE INVENTION

This invention is concerned with improvements in or relating to processes for the concentration of nitric acid, and especially to such processes with which continuous operation is facilitated by the direct coupling of the concentration of the nitric acid with the reconcentration of the dehydrating agent.

BACKGROUND OF THE INVENTION

Nitric acid is produced industrially in large volumes through the oxidation of ammonia in air over a catalyst, usually platinum, and the subsequent absorption of the nitrogen oxides in water. The "weak" nitric acid produced in such a process normally has a strength about 55% to 65% $HNO_3$, the balance being water. It is not possible to concentrate this acid through simple distillation beyond about 68% $HNO_3$, since an azeotrope exists at that concentration. "Strong" nitric acid of strength of above 95% $HNO_3$ is required in some important industrial processes, such as certain nitration and oxidation processes, and to obtain nitric acid of this strength dehydrating agents are commonly employed which "break" the azeotrope. Dehydrating agents function by preferentially "binding" the water thereby leaving the vapor above the solution richer in nitric acid. It is known that normally a minimum proportion of the dehydrating agent is needed to "break" the azeotrope.

The use of sulfuric acid as a dehydrating agent in nitric acid concentration is well established, but many other dehydrating agents have been proposed and a number have found commercial application. Examples of dehydrating agents described and claimed in the patent literature are calcium nitrate and magnesium nitrate (R. Wolfenstein and O. Boeters U.S. Pat. No. 864,217); magnesium nitrate (A. P. Beardsley U.S. Pat. No. 2,463,453); and lithium nitrate (A. W. Yodis U.S. Pat. No. 3,433,718). To facilitate the following discussion reference is usually made to sulfuric acid as the dehydrating agent, although such other agents can also be used.

In a simple batch distillation process of a suitable mixed acid consisting of sulfuric acid, nitric acid and water, as nitric acid is removed by vaporization from the mixed acid its weight fraction in the liquid phase decreases while that of water increases. This results in the progressive decline in the strength of the nitric acid vapor produced until recovery becomes uneconomical. Compared to batch distillation the economy of nitric acid concentration and its recovery are greatly improved if the mixed acid is passed countercurrently through a packed column with steam rising from the bottom, as disclosed for example in H. Pauling U.S. Pat. No. 1,031,864. The steam condenses as it rises in the column thereby vaporizing nitric acid from the mixed acid. Strong nitric acid is obtained as vapor at the top of the column, while boiling sulfuric acid of about 68% to 72% $H_2SO_4$, containing only traces of nitric acid, is discharged at the bottom. The live steam injected into the column supplies the energy for the process in an economical manner, i.e. the heat to vaporize the nitric acid and the heat required to bring the sulfuric acid to its boiling point, but it also dilutes the sulfuric acid and thus increases the amount of "strong" sulfuric acid required for the process. This is because the strength of the spent sulfuric acid at the bottom of the column must not be allowed to drop much below 68% $H_2SO_4$. If the spent sulfuric acid is allowed to drop below this strength, an increasing amount of nitric acid will stay with this spent sulfuric acid and will ultimately be lost as this spent sulfuric acid is reconcentrated. The reason for this is that the dehydrating capacity of sulfuric acid decreases rapidly as the spent sulfuric acid strength falls below 68% $H_2SO_4$.

"Live steam" usage can be reduced if the nitric and sulfuric acids are fed separately into the concentration column, so that the heat of mixing between these two acids is released within the column; such a process has been disclosed in H. Pauling U.S. Pat. No. 1,074,287. It is possible to avoid "live steam" injection altogether by using steam heated boiling tubes, as disclosed in S. F. Spangler U.S. Pat. No. 1,895,012. The benefits of indirect heating are, however, only of marginal value since the energy requirements of the nitric acid concentration process are relatively low, particularly if the heat of mixing is liberated within the column. Moreover, although it is preferred to avoid dilution of the sulfuric acid for the reason given above, the dilution due to "live steam" injection is relatively small since most of the water absorbed by the sulfuric acid comes from the water that enters the process with the "weak" nitric acid. In modern nitric acid concentration plants energy requirements ar normally met by steam heated boiling tubes (which are usually of high corrosion resistant and expensive metal such as tantalum) often in conjunction with some "live steam" injection. Air injection into the bottom of the concentration column is also practiced, and has the effect of lowering temperatures throughout the column. A review of industrial practice of nitric acid concentration is given in a paper by D. Gericke in Chemie Ingenieur Technik, Volume 21/74, pages 894–899.

Passing of the sulfuric and nitric acids into the concentration column at the proper strengths and in the proper mass ratio is important for efficient use of sulfuric acid and for good yield of nitric acid, but it is by itself not a guarantee that "strong" nitric acid will be produced and that the spent sulfuric acid will contain only small amounts of residual nitric acid; the energy requirements of the process must also be met exactly. Energy input in excess of process requirements through the boiling tubes or through "live steam" injection could lead to a situation where nitric acid of a strength below that specified is produced, while the strength of the spent sulfuric acid increases above the normal operating range of 68%–72% $H_2SO_4$. This is because steam is forced up through the concentration column and leaves with the nitric acid vapor at the top of the column thereby diluting the "strong" nitric acid. Insufficient energy input could lead to a situation where "strong" nitric acid might be produced, but where part of the nitric acid stays with the spent sulfuric acid; the spent sulfuric acid is said to be not properly denitrated. The operation of a nitric acid concentration column requires good control of the acid feed rates into the concentration column and of the energy supplied to the process. In industrial practice process conditions are commonly monitored by recording tops and bottoms temperatures of the concentration column in addition to process feed rates and energy input to the process. The composition of the product "strong" nitric acid and of the spent sulfuric acid are also monitored.

The strength of the nitric acid produced in a nitric acid concentrator is commonly controlled in one of two ways, namely by refluxing part of the concentrated "strong" nitric acid to the top of the column or by injecting "strong" sulfuric acid into the column at an elevation above that of the "weak" nitric acid feed point. Only a small amount of reflux of "strong" nitric acid is required, and this reflux converts the top of the nitric acid concentration column into an enriching section operated above the azeotrope of nitric acid. The injection of the "strong" sulfuric acid at an elevation above that of the "weak" nitric acid feed point puts the sulfuric acid of highest concentration, which exhibits the highest relative volatility for nitric acid, into contact with the "strong" nitric acid vapor discharged at the top of the concentration column. However, in commercial practice ideal equilibrium conditions are far from being reached, and in many plants control of the strength of the product "strong" nitric acid is achieved through a combination of the above two methods. Refluxing of part of the "strong" nitric acid has the additional benefit of condensing and collecting trace quantities of sulfuric acid vapor.

At the bottom of the column the strength of the spent sulfuric acid must be kept in the range of about 68% to 72% $H_2SO_4$. A lowering of this strength, which would be obtained if the "strong" sulfuric acid feed rate into process is reduced in relation to the "weak" nitric acid feed rate, will lead to unacceptably high levels of nitric acid in the spent sulfuric acid, and that constitutes a yield loss. The reason for this loss in nitric acid is the fact that the relative volatility of nitric acid decreases rapidly if the strength of the spent sulfuric acid is allowed to drop below a strength of about 68% $H_2SO_4$. For a column of a given packing height a decrease in the spent sulfuric acid strength leads to a higher residual nitric acid level in the spent acid, even if the energy input is adequate. An increase in the steam rate to process does not necessarily help the situation since the spent sulfuric acid could be further diluted. It is quite possible, through energy input in excess of the process requirements and through improper feed rates to process, to produce nitric acid of unacceptably low strength, while at the same time producing a spent sulfuric acid containing high levels of residual nitric acid.

A major expense in nitric acid concentration is the disposal or reconcentration of the spent sulfuric acid. If sulfuric acid is used on a once-through basis, then storage facilities must be provided for the strong and the spent sulfuric acids, and further expenses are incurred in shipping them. Moreover, the once-through approach ties the nitric acid concentration plant to sulfuric acid supply and disposal facilities. On the other hand, sulfuric acid reconcentration and recycle of this acid in a closed sulfuric acid loop is an energy intensive process, in that not only must the water absorbed by the spent sulfuric acid be removed through vaporization, but in that an amount of energy equivalent to the heat of mixing must be provided. The availability of the heat of dilution or the heat of mixing in the nitric acid concentration column makes this part of the process a relatively low energy consumer, but the penalty is paid in the sulfuric acid reconcentration process, where an equivalent amount of energy must be supplied to again separate sulfuric acid and water by preferentially boiling off the water. Furthermore, there is little opportunity for energy recovery since both the spent sulfuric acid produced in the nitric acid concentration column and the "strong" sulfuric acid discharged from a vacuum sulfuric acid concentrator are at about the same high temperature. The reconcentrated "strong" sulfuric acid must be cooled before being recycled to the nitric acid concentration column, since feed of the hot acid could cause excessive energy input to the nitric acid concentration column with consequences already discussed. Cooling of the sulfuric acid anywhere in the sulfuric acid loop implies that energy is rejected from the process, which must again be resupplied somewhere else in the process. To make matters worse, this energy transfer in the process must usually be implemented using very expensive tantalum equipment. Steam requirements for the nitric acid reconcentration process including sulfuric acid concentration are given in the above-mentioned paper by Gericke as 3.5 tons of steam per ton of "strong" nitric acid for the case of a feed nitric acid of 55% $HNO_3$. In processes where the sulfuric acid is used on a once-through basis, the requirements of "strong" sulfuric acid are of the order of 2.5 tons per ton of nitric acid; this latter figure varies somewhat depending on the strengths of the feed "weak" nitric acid and of the "strong" sulfuric acid used in the process.

The focus of most prior art has been on the development of an efficient nitric acid concentration process, and the associated problem of sulfuric acid reconcentration has been relatively neglected. Sulfuric acid has a high boiling point as compared with nitric acid and reconcentration of sulfuric acid is notoriously difficult. For this reason, the use of 80% $H_2SO_4$ in place of the commercial 94% $H_2SO_4$ is advocated in U.S. Pat. No. 1,074,287 (also to H. Pauling), since reconcentration to 80% $H_2SO_4$ is much easier than to 94% $H_2SO_4$, mainly because of the lower boiling point of the former. Even when concentration is carried out under vacuum relatively high temperatures are necessary, requiring the use of high pressure steam in the boiling tubes and of expensive corrosion resistant heat transfer surfaces.

DEFINITION OF THE INVENTION

It is an object of the present invention to provide new continuously operable processes for the concentration of nitric acid by employment of a dehydrating agent, and by including concurrent reconcentration of the dehydrating agent.

It is a specific object to provide such processes in which the energy requirement can be substantially reduced as compared with prior art processes.

In accordance with the present invention there is provided a process for the integrated concentration of nitric acid by a dehydrating agent and reconcentration of the dehydrating agent, said process comprising the steps of:

(a) splitting a feed stream of an aqueous solution of feed nitric acid to be concentrated to result in a larger fraction and a smaller fraction;

(b) vaporizing at least the larger feed nitric acid fraction to result in a larger feed nitric acid vapor fraction;

(c) directly contacting the larger feed nitric acid vapor fraction with a first portion of the dehydrating agent to bind water therefrom and result in a concentrated vapor stream of nitric acid and a diluted stream of said first portion of the dehydrating agent.

(d) mixing said smaller fraction of the feed nitric acid and a second portion of the dehydrating agent;

(e) contacting the concentrated vapor stream in the column with the mixture resulting from step (d) to result in a more concentrated vapor stream of nitric acid and a diluted stream of said second portion of the dehydrating agent;

(f) discharging the more concentrated nitric acid vapor from step (e) from the column, and condensing it to obtain corresponding more concentrated nitric acid;

(g) boiling the diluted streams of said first and second portions of the dehydrating agent from steps (c) and (e) to remove nitric acid therefrom and to produce spent dehydrating agent; and (h) reconcentrating and recirculating the spent dehydrating agent of step (g) for use in steps (c) and (d).

Preferably, the liquid dehydrating agent is an aqueous solution of sulfuric acid, or of magnesium nitrate.

Preferably also, the process includes the further step of:

(i) contacting the more concentrated vapor stream of nitric acid from step (e) with a third portion of the dehydrating agent to remove part of residual water vapor from said more concentrated vapor stream of nitric acid to result in a still more concentrated vapor stream of nitric acid.

Preferably also, the process includes the further step of:

(j) refluxing condensed more concentrated nitric acid from step (f) to contact said still more concentrated vapor stream of nitric acid of step (i) to collect part of any residual amount of water vapor from the still more concentrated vapor stream of nitric acid and part of any dehydrating agent in the still more concentrated vapor stream of nitric acid.

The spent dehydrating agent of step (g) may be reconcentrated without further energy input either in a vacuum equilibrium flash concentrator, or in an evaporative cooler concentrator using air.

Preferably, at least steps (c), (e), (g) and (i) are effected in a single column and the reconcentrated dehydrating agent is recirculated to the column in three portions at three respective separate locations to be used respectively in steps (c), (e) and (i).

BRIEF DESCRIPTION OF THE DRAWINGS

Particular preferred embodiments of the invention will now be described, by way of example, with reference to the accompanying schematic drawings, wherein.

DESCRIPTION OF THE PREFERRED EMBODIMENTS

Figure 1:
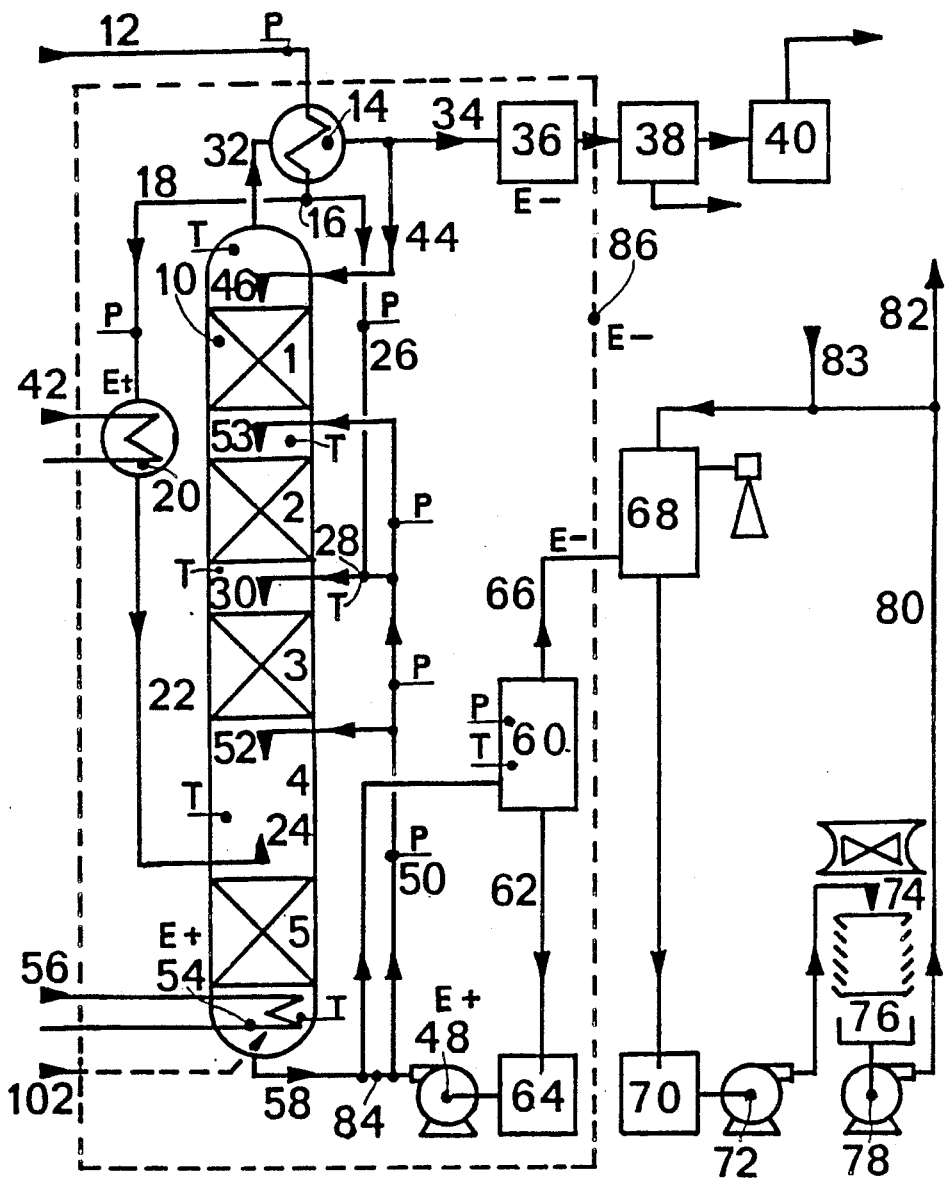
FIG. 1 illustrates a first embodiment of the invention and the apparatus required for its implementation.

Referring now to FIG. 1 the process which is a first embodiment of the invention is carried out in a vertical nitric acid concentration column 10, which effectively comprises five separate functional sections 1 through 5, numbered sequentially from top to bottom. The feed consisting of the "weak" nitric acid is fed from pipe 12 through a preheater 14 and is then divided at junction 16 into a larger fraction (usually about 51% to 99% by weight) that flows through pipe 18 to a nitric acid vaporizer 20, and thence through pipe 22 to nozzle 24 of condenser section 4 of the column. A smaller fraction flows from the junction 16 through pipe 26 to junction 28 and thence to nozzle 30 of section 3 of the column whose function will be described below. The nitric acid vapor moves upward in the column and the resultant hot, concentrated "strong" nitric acid vapor exits via pipe 32 to the preheater 14 where it is cooled and partially condensed while preheating the incoming feed "weak" nitric acid, the resultant mixture of liquid and vapor then passing via outlet pipe 34 to the condenser 36, bleacher 38 and fume absorber 40 also employed in conventional processes. The condenser 36, where "strong" nitric acid vapor not condensed in preheater 14 is finally condensed, constitutes a source of heat rejection from the process, which is so indicated by the sign E−. The vaporizer 20 constitutes a heat (energy) input element to the system and is so indicated by the symbol E+; the heat is in this embodiment provided by means of low pressure steam supplied to the vaporizer by pipe 42. A small reflux stream (usually about 0.1% to 10% by weight of the production rate) of the concentrated "strong" nitric acid is recycled from the pipe 34 via pipe 44 to nozzle 46 at the top of the column to control the strength of the exiting nitric acid vapor by preferentially condensing water vapor from the nitric acid vapor stream ascending inside the column and also to capture an traces of the dehydrating agent carried in the "strong" nitric acid vapor stream passing through section 1 of the column 10.

The dehydrating agent employed in this embodiment of the process is sulfuric acid, preferably between 71% and 79% by weight and the sulfuric acid loop through the apparatus is established by the sulfuric acid pump 48, which also acts as an energy input to the system and is also therefore indicated by the symbol E+. Reconcentrated "strong" sulfuric acid from the pump outlet is supplied via pipe 50 to three separate sections of the column, the first portion (usually about 51% to 99% by weight) being fed to nozzle 52 of condenser section 4, while a second portion (usually about 1% to 49% by weight) is fed to junction 28 to mix with the preheated liquid nitric acid in a predetermined ratio and to discharge through nozzle 30 into section 3. A third portion (usually about 1% to 20% by weight) is fed to nozzle 53 of section 2 where it functions as a slip stream to collect residual water vapor from the upwardly moving "strong" nitric acid vapor stream. The spent sulfuric acid at the bottom of the column 10 is boiled by a column reboiler 54 supplied with high pressure steam via pipe 56; the reboiler is another source of energy input to the system and is indicated by the symbol E+. Nitric acid and water are vaporized in this reboiler to strip the mixed acid flowing through section 5 of column 10 and to return nitric acid to the condenser section 4 of the column 10.

The hot dilute spent sulfuric acid from the bottom of the column passes through pipe 58 to an equilibrium flash concentrator 60, the reconcentrated "strong" sulfuric acid passing through pipe 62 to a pump tank 64 and thence to the inlet of pump 48. The hot water vapor from the flash concentrator passes via pipe 66 to a barometric condenser 68, which is operated under vacuum, and where the hot water vapor is condensed through contact with cooling water. The condensed water and the circulating cooling water then pass to a seal tank 70, to a pump 72 and to nozzle 74 of a cooling tower 76. The cooled water at the foot of the cooling tower is fed by main cooling water pump 78 and pipe 80 back to the condenser 68, purge water being bled from the water circuit as required through pipe 82. Energy is removed from the process through the cooling water recycled from the cooling tower 76 to the condenser and this is indicated by the symbol E− at the inlet of pipe 66 to the condenser 68. A stream of an alkaline solution, usually caustic soda, is injected into the condensed water loop from pipe 83 to neutralize any trace amounts of nitric and sulfuric acids that enter the water loop through carry-over in the equilibrium flash concentrator. A portion (usually about 1% to 90 % by weight) of the reconcentrated sulfuric acid can be recycled through pipe 84 back to the equilibrium flash concentrator 60 to mix in the transfer line 58 with the boiling spent sulfuric acid from column 10 so as to drop the temperature of the sulfuric acid in line 58. This prevents undue flashing of the sulfuric acid in the transfer line 58 as the pressure to which this acid is subjected changes from essentially atmospheric pressure in the column section 5 to vacuum in the equilibrium flash concentrator 60.

In broad terms the operation of the process is that in section 4 of the column the bulk of the nitric acid, converted to vapor form by the vaporizer 20, is brought into contact with the bulk (the first portion) of the reconcentrated circulating sulfuric acid. This part of the column can therefore be considered to be acting as a direct contact condenser. Most of the energy from the vaporized nitric acid solution is absorbed into the sulfuric acid cycle in this section by preferentially condensing water vapor. The sulfuric acid descending to section 5 will contain a certain amount of nitric acid, approaching equilibrium with the feed nitric acid vapor; the boiling of this acid in the reboiler of section 5 will return most of this nitric acid to section 4, as described above. The ascending nitric acid vapor out of section 4, estimated to be of strength in the range 65% to 90% by weight, is contacted in section 3 with the mixture of feed "weak" nitric acid and a second portion of the reconcentrated "strong" sulfuric acid, the two being mixed in junction 28 in a predetermined ratio such that the vapors in equilibrium with this mixed acid consist mostly of nitric acid, to produce a "strong" nitric acid vapor, estimated to be of strength in the range 85% to 96% by weight, as will be described in more detail below. In section 2 the strong nitric acid vapor emerging from section 3 is contacted with a third portion of the reconcentrated "strong" sulfuric acid to ensure that essentially only strong nitric acid vapor (estimated to be of strength 95% to 98% $HNO_3$) can escape at the top of the column; this process is continued in section 1 where also trace amounts of sulfuric acid carried in the "strong" nitric acid vapor stream are condensed and trapped and where residual amounts of water vapor are preferentially condensed, as described above, by use of a minor reflux stream of condensed "strong" nitric acid. The operation of section 1 is employed to control the strength of the product "strong" nitric acid, as in prior art processes.

Figure 2:
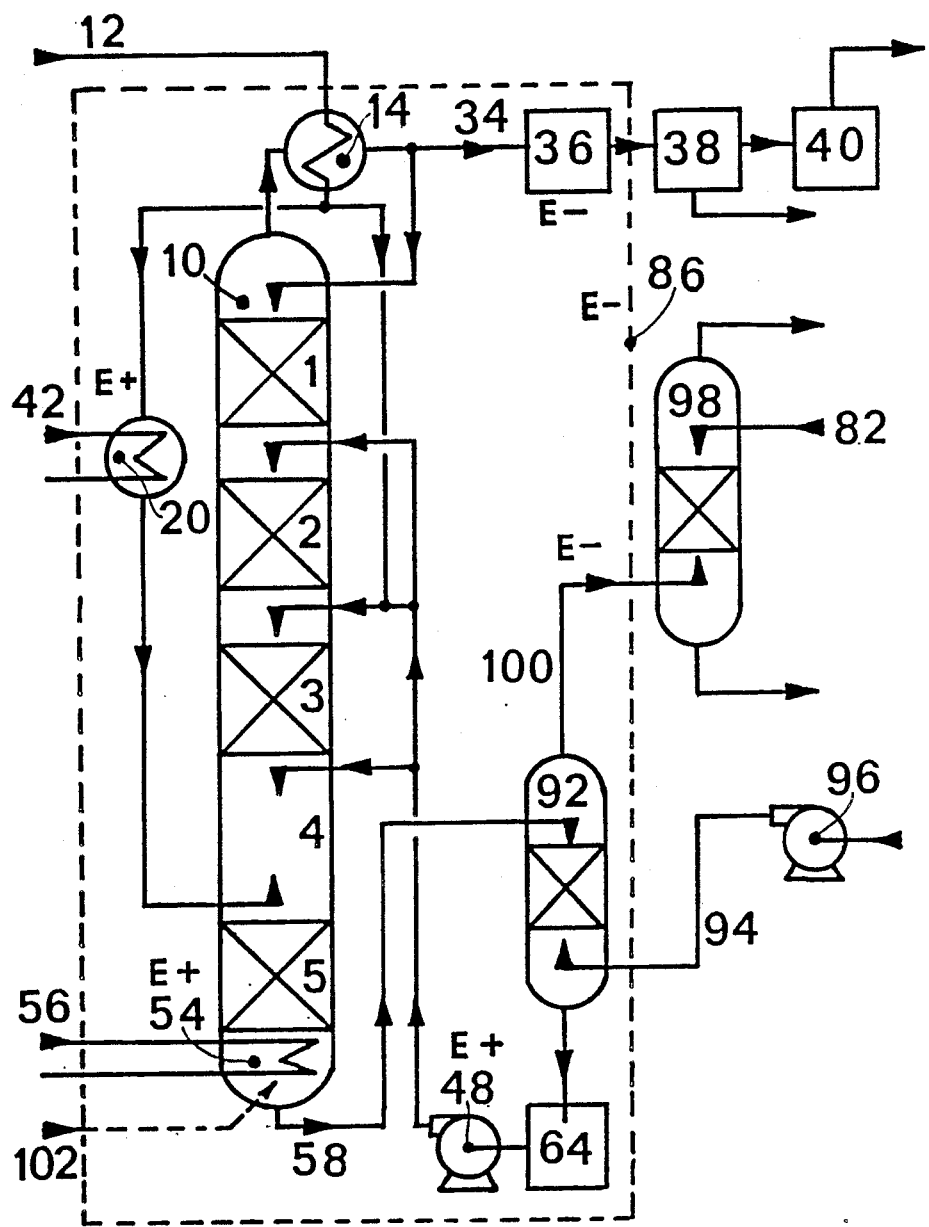
FIG. 2 is a similar drawing to illustrate a second embodiment of the invention.

The broken line 86 of FIG. 2 delineates a "control" volume enclosing the elements of the process apparatus that must be considered in determining the overall energy balance of the system to ensure effective operation, as described above. The feed "weak" nitric acid crosses this boundary as liquid to the preheater 14 and then passes to the nitric acid vaporizer 20 where it receives energy through steam pipe 42. Energy supplied to the reboiler 54 through steam pipe 56 will ultimately vaporize the liquid "weak" nitric acid portion in the pipe 26. The reflux of "strong" nitric acid to the nozzle 46 is minimal, as indicated above. The energy loss E− via the water vapor leaving the flash concentrator through pipe 66 has been described above. The condenser 36 constitutes the second principal source of energy rejection and is indicated by E−. The entire process is of course subject to convective heat losses, indicated by the symbol E− designated for the broken line 86, and these convective heat losses are compensated partially through the energy input to the sulfuric acid circulation pump 48. The power input to this pump is ultimately dissipated into heat, indicated by the symbol E+. The overall energy balance is best visualized noting that liquid "weak" nitric acid enters through pipe 12, that water vapor leaves through pipe 66 and that "strong" nitric acid leaves through pipe 34 to be condensed in condenser 36. The energy required is provided through the vaporizer 20 and the reboiler 54. Part of the flow in pipe 34 will be in liquid form due to condensation of nitric acid in the preheater 14.

The processes of the invention are characterized in that the concentration of the nitric acid and the reconcentration of the sulfuric acid are integrated and coupled and effectively no energy is rejected from the sulfuric acid circulation loop through unnecessary cooling. It is a feature of the invention that it involves complete integration and coupling of the two sub-processes of nitric acid concentration and of sulfuric acid reconcentration in a single unit. It is of course the prime objective of the process to concentrate the nitric acid as economically as possible, the unavoidable reconcentration of the sulfuric acid is implemented to best serve this prime objective. Another feature of the preferred processes is the choice of the location where energy is applied to the process Thus, by vaporizing a large part of the "weak" nitric acid feed a significant part of the energy requirements of the process are met in this step and, due to the low boiling point of "weak" nitric acid, can be met using low pressure steam, which frequently is available at industrial sites as waste steam. Direct process coupling of the nitric acid concentration and of the sulfuric acid reconcentration eliminates the need for substantial sulfuric acid storage. A result of the low hold-up requirements of sulfuric acid is a process in which a sulfuric acid inventory corresponding to not more than 10 minutes circulation of sulfuric acid is quite adequate.

As described above, in my new nitric acid concentration process the feed "weak" nitric acid is divided into two parts, the larger part being vaporized and sent into the nitric acid concentration column as vapor while the other part is mixed with a portion of the "strong" sulfuric acid in the liquid phase at junction 28. The preferred form of the nitric acid concentration column consist of 5 functional parts. The first top packed section uses reflux "strong" nitric acid to control "strong" nitric acid product strength by preferentially condensing water vapor, and to trap traces of sulfuric acid carried in this vapor stream. In the second section a small stream of reconcentrated "strong" sulfuric acid (the third portion) is injected through nozzle 53 where it will be in contact with "strong" nitric acid vapor, condensing part of it and condensing preferentially water vapor present at that point, thereby producing as overheads "strong" nitric acid of about 95% –98% HNO₃; water vapor will be present at that point of the column due to the vapor pressure of the reconcentrated "strong" sulfuric acid. In section 3 a mixed acid is injected through nozzle 30 containing the part of the feed "weak" nitric acid which has not been vaporized and a fraction (the second portion) of the circulating reconcentrated "strong" sulfuric acid; these two acids are mixed in such a proportion that the vapor above the mix contains about 85% to 98% HNO₃. The mixed acid entering through nozzle 30 will be rich in nitric acid and will be close to its boiling point as will be further explained below. Section 4 acts as a direct contact condenser where the bulk of the recirculated sulfuric acid meets the "weak" nitric acid vapor generated in the nitric acid vaporizer and condenses part of this vapor. If nitric acid of 65% HNO₃ is vaporized in the nitric acid vaporizer, then the mixed acid present inside the column will condense part of this acid until equilibrium compositions are approached, which usually corresponds to a level of about 2.5% HNO₃ by weight in the mixed acid at the bottom of this condenser section. In the bottom section 5 the mixed acid present in this part of the column is denitrated, i.e. stripped free of nitric acid, by reboiling. It is important to match the overall sulfuric acid circulation rate to the overall "weak" nitric acid feed rate, while the split of the sulfuric acid into at least three separate portions is important for controlling the strength of the "strong" nitric acid produced. Thus, as described above, with the use of the first and second portions of the reconcentrated "strong" sulfuric acid "strong" nitric acid vapor of maximum strength about 96% can be obtained, and often a product of this strength is sufficient, while the additional use of the third portion enables higher strengths to be achieved. It is also important to provide the proper amount of energy input to the process by vaporizing the nitric acid and by reboiling the spent sulfuric acid. If the energy input is not properly matched to the production rate, then "strong" nitric acid of a strength outside specification limitations or spent sulfuric acid still containing residual nitric acid will be produced, as described above.

The spent sulfuric acid discharged from the bottom of the column is sent directly to the vacuum flash concentrator (or its equivalent) where it is reconcentrated without further energy input by flashing under vacuum. The amount of water flashed in the concentrator must be equal to the amount of water entering the process with the "weak" nitric acid. The temperature of the sulfuric acid drops from the boiling temperature at the bottom of the column (close to atmospheric pressure) to the vacuum boiling temperature in the flash concentrator. This temperature drop, usually of about 65° C., provides the energy required for vaporization of water in the equilibrium flash concentrator. The sulfuric acid circulation rate in relation to the nitric acid production rate is considerably larger than in conventional processes so that the difference in strength between the spent "strong" sulfuric acid and the reconcentrated "strong" sulfuric acid is correspondingly smaller, only about 3.2 percentage points. The reconcentrated "strong" sulfuric acid is recycled without any cooling to the column where it is again ready to absorb an amount of water equal to the amount which has been removed by flashing in the equilibrium flash concentrator. The spent sulfuric acid typically will have a strength of about 72% H₂SO₄, while the reconcentrated "strong" sulfuric acid has a strength of about 75.2% H₂SO₄. Some deviation from these target values can be tolerated. However, operation at lower sulhuric acid strength would require generally more packing height in the column since the relative volatility of nitric acid decreases with decreasing sulphuric acid strength, while higher sulfuric acid strengths will lead to higher operating temperatures in the nitric acid concentration column which will ultimately cause problems in the selection of the materials of construction.

A principal advantage of the process is the extent to which it becomes possible to eliminate rejection of heat anywhere in the process. As already pointed out above, any heat rejected from process must be resupplied elsewhere in the sulfuric acid loop. In this context the proper control of nitric acid strength produced at the top of the column by the process, without the need for excessive reflux of nitric acid in section 1, is important. Thus, if escape of water is avoided at the top of the column, then all water entering with the nitric acid will be absorbed by the circulating sulfuric acid. The overall energy balance for the process is simple, in that the nitric acid and its associated water enter the process as a liquid; the liquid feed "weak" nitric acid will ultimately be vaporized in the vaporizer 20 or by reboiling in the bottom of the column through reboiler 54. "Strong" nitric acid vapor leaves the process as overheads from the column partially condensing in the preheater and water vapor is flashed in the vacuum concentrator 60, the total of the two streams being equal to the total stream of "weak" nitric acid entering the process. No substantial quantity of energy is lost or rejected from the process, energy losses due to convective heat losses from the process are only a small fraction of the overall energy input, and are partially compensated for by the energy input through the sulfuric acid circulation pump 48.

A principal benefit of the new processes is that the energy requirements are much lower than these of existing processes when the energy requirements for sulfuric acid reconcentration is included in the total calculation. The energy requirements are approximately equal to the energy required to vaporize the nitric acid, which is about 1.05 tons of steam for 1 ton of 100% nitric acid in the case where the strength of the "weak" nitric acid is 65% HNO₃. Lower strength feed "weak" nitric acid will require a somewhat higher energy input since more water is present in the weaker feed nitric acid. A second benefit of the process is that a large part of the energy requirements are met by vaporizing feed "weak" nitric acid where low pressure steam is adequate and where the use of expensive tantalum heaters or heat exchangers is not required. Compared to once-through sulfuric acid processes the costs for sulfuric acid storage and for shipping are of course saved. The estimated energy requirement for the process may be contrasted with the usual figure for known processes of the order of 1.65 tons of steam per ton of nitric acid to result in a saving of about 0.60 ton of steam per ton of concentrated "strong" nitric acid An average large plant operates with an acid capacity of about 100 tons per day resulting in a total steam saving of about 60 tons per day. The above consumption figures and savings are approximate only, precise data will depend on design details such as energy recovery effectiveness and the strength of the feed "weak" nitric acid.

By comparison a well established integrated plant for nitric acid concentration employing sulfuric acid has a cooler in the sulfuric acid loop, which constitutes a heat rejection from the system and this cooler is not required for the processes of the invention. It also employs a heat exchanger to preheat the "weak" nitric acid feed and to recover as much heat as possible; this heat exchanger is also not required. In a well established process a condenser is provided to condense the concentrated nitric acid product. This again constitutes heat rejection while in the new processes part of this heat is recovered in the nitric acid preheater.

The main process control loops required in my new process are the pressure control in the vacuum sulfuric acid concentrator through which the strength and the temperature of the reconcentrated "strong" sulfuric acid are controlled, the flow rates of the feed "weak" nitric acid and of the "strong" sulfuric acid and the ratio between these two streams, the preferred locations for measurements of these process parameters being shown in the drawings by the designations P. The energy input is controlled through the steam flow rates to the nitric acid vaporizer 20 and the reboiler 54, the split of energy between the two sources of heat application being established in accordance with the split in the nitric acid feed between the two streams in the pipes 22 and 26. The process operation is monitored by recording temperatures at various locations in the sulfuric acid loop, the preferred locations for these temperature measurements being shown in the drawings by the designations T. Excessive entrainment of nitric acid in the spent sulfuric acid is noted through increased carry-over of nitric acid in the equilibrium flash concentrator and through increased caustic requirements in the condenser 68 of the cooling water loop.

FIG. 2 shows an alternative apparatus for implementation of the invention in which the sulfuric acid is reconcentrated by evaporative cooling using air, in place of the vacuum flash concentrator of the apparatus of FIG. 1. The same references are used for the same components wherever that is possible. In this apparatus the boiling spent sulfuric acid discharged via pipe 58 from the bottom of the column 10 is fed to the top of a packed acid cooling tower 92, where it is concentrated through evaporative cooling by a countercurrent stream of air delivered via pipe 94 by a fan 96. From the bottom of the cooling tower the reconcentrated "strong" sulfuric acid flows to the sulfuric acid pump tank 64 from where it is recycled to the process as before. A small scrubber 98 using process water and some caustic input via pipe 82 is used to condense any traces of acid vapors received from the acid cooling tower 92 via pipe 100, since discharge of even small amounts of acid would be objectionable in a plant environment. Compared to the vacuum flash concentration process this evaporative cooling and concentration process rejects energy directly to the ambient air without passing through the secondary cooling water loop. Thus the cooling water loop to the condenser of the equilibrium flash concentrator is completely eliminated and cooling water is required only for the nitric acid condenser 36. Due to the smaller circulation rate of the sulfuric acid compared to that of the cooling water, a much smaller fan 96 will be sufficient to achieve evaporative cooling and concentration of the spent sulfuric acid. Control of the strength of the reconcentrated "strong" sulfuric acid is achieved through flow control of the cooling air. However, cooling water requirements are substantially reduced and the costs for vacuum equipment and a water cooling tower are saved. Operation of the nitric acid concentration column and the nitric and sulfuric acid circulation rates essentially remain unaffected.

Figure 3:
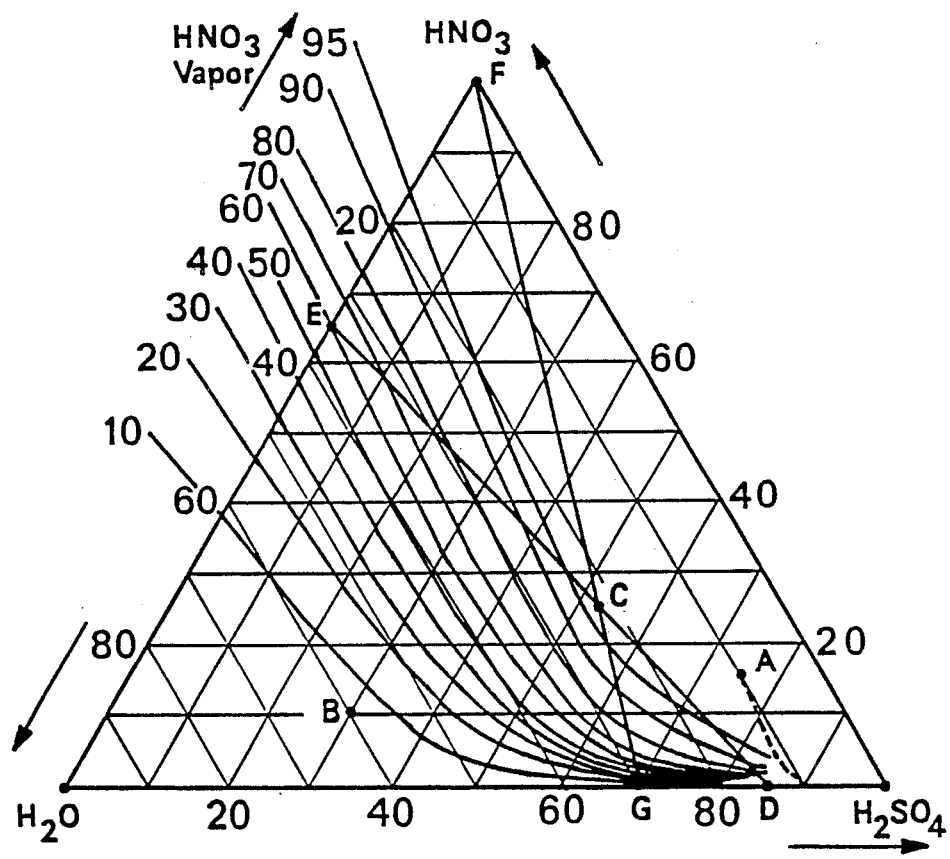
FIG. 3 is a triangular diagram illustrating the ternary system of nitric acid, sulfuric acid and water and the vapor composition above the mixture.

The function of the sulfuric acid in nitric acid concentration is best explained by referring to FIG. 3, which represents the ternary system consisting of nitric acid, sulfuric acid and water in a triangular diagram. Similar diagrams for other dehydrating agents have been published in the literature. FIG. 3 is drawn based on data published by S. R. M. Ellis and J. M. Thwaites (J. Appl. Chem., Volume 7, April, 1957). The lines shown in FIG. 3 give the weight percent of nitric acid in the vapor space above the mixed acid at its atmospheric boiling point, the balance being mostly water. Sulfuric acid has an extremely low partial pressure except when its concentration approaches 97% $H_2SO_4$, where sulfuric acid forms an azeotrope. Except at very high strengths sulfuric acid will therefore be present only in trace amounts in the vapor space. Point A in FIG. 3 represents a mixture of 75% $H_2SO_4$, 15% $HNO_3$ and 10% $H_2O$. If the mixed acid represented by this point is distilled in a batch distillation process, strong nitric acid corresponding to the vapor composition in equilibrium with the mixed acid in the distillation apparatus will initially be produced. The strength of the nitric acid produced is well above the weight fraction of the nitric acid in the liquid phase on a sulfuric acid free basis. As nitric acid is removed from the mixed acid through distillation, its weight fraction in the liquid phase will decrease resulting in the gradual decline in the strength of the nitric acid produced until recovery by batch distillation becomes uneconomical. A qualitative distillation trajectory starting from point A is shown through the dashed line in FIG. 3. However, when starting a batch distillation from the conditions set by point A, the concentration of the nitric acid in the vapor space always stays above that in the liquid phase on a sulfuric acid free basis. The presence of sulfuric acid in the mixed acid has in effect eliminated the nitric acid azeotrope. For the mixed acid represented by point B in FIG. 3 (30% $H_2SO_4$, 10% $HNO_3$, 60% $H_2O$) the weight fraction of nitric acid in the vapor space is below that of the nitric acid in the mixed acid on a sulfuric acid free basis. This shows, as stated above, that a certain quantity of sulfuric acid must be present in the mixed acid in order to break the nitric acid azeotrope.

A good measure of the capacity of sulfuric acid to break the nitric acid azeotrope is the relative volatility defined on a sulfuric acid free basis as $$(Y_{HNO_3} \cdot X_{H_2O})/(X_{HNO_3} \cdot Y_{H_2O})$$

where Y is the mole fraction in the vapor space and X is the mole fraction in the liquid phase. Data reported by Ellis and Thwaites show a relative volatility of around 10 for sulfuric acid of 70% $H_2SO_4$ and a relative volatility of less than 1 for sulfuric acid of 38% $H_2SO_4$, both values applying to the case of low nitric acid weight fractions in the mixed acid. Relative volatility increases with sulfuric acid strength and also with the weight fraction of nitric acid. This suggests therefore that for the mixed acid employed in section 3 of the column, which is mixed at junction 28 by blending feed nitric acid and reconcentrated sulfuric acid, the ratio of the two acid flows must be adjusted to ensure that the nitric acid content of the vapor above this mix is sufficiently high. Point C in FIG. 3 represents an example of a suitable mixed acid composition but many other mixed acid compositions are suitable as long as the vapor above the mixed acid is rich in nitric acid and as long as the mixed acid at junction 28 can be prepared by mixing reconcentrated "strong" sulfuric acid and feed "weak" nitric acid.

Some important process features of the nitric acid concentration in packed columns can further be elucidated referring again to FIG. 3. A mixed acid of composition C can be prepared by mixing sulfuric acid of composition D and nitric acid of composition E. All mixed acids which can be prepared by mixing acids D and E in various mass ratios fall on a straight line connecting these two points. Composition C is obtained by mixing the two acids according to the inverse lever arm rule such that nitric acid and sulfuric acid are combined in a mass ratio corresponding to the ratio of the distances C-D (for nitric acid) and C-E (for sulfuric acid). The total mass of the product acids, "strong" nitric acid of composition close to 100% $HNO_3$ and spent sulfuric acid of about 70% $H_2SO_4$, must be equal to the mass of the feed acids entering the column. Hence, if the two product acids are mixed, a mixed acid of composition C is again obtained The two product acids are produced in a mass ratio corresponding to the ratio of the distances C-F (for the spent sulfuric acid) and C-G (for the "strong" nitric acid). The quantity of sulfuric acid required for the concentration of nitric acid can be obtained from the intercepts of the lines F-G and D-E using the inverse lever arm rule. The effects of changes in nitric acid strength and in sulfuric acid strength can easily be obtained visually from FIG. 3. For example, reducing the strength of the reconcentrated sulfuric acid, which means moving point D towards point G, increases the required feed rate of the "strong" sulfuric acid as well as the quantity of spent sulfuric acid produced.

The foregoing description of processes of the invention has been presented with reference to sulfuric acid as the dehydrating agent, but can also be implemented with similar advantages by use of other dehydrating agents, such as magnesium nitrate, calcium nitrate or phosphoric acid, in logically equivalent fashion. For each dehydrating agent it is necessary to select a suitable strength, a suitable circulation rate and a split of the dehydrating agent into suitable portions in relation to the "weak" nitric acid feed rate, and it will be necessary to select the required proper operating temperatures and pressures, as will be apparent to those skilled in the art.

It may be noted that the reboiler 54 can be used as the energy source for start-up purposes.

In alternative versions of the processes illustrated by FIGS. 1 and 2, the reboiler 54 at the bottom of the column 10 is replaced by a "live steam" injector 102, shown in broken lines in FIGS. 1 and 2. Because of the "live steam" injection an increase is required in the sulfuric acid circulation rate but this live steam does not contribute significantly to the energy requirements of the nitric acid concentration process, since this steam will flash in the vacuum concentrator 60, after it has stripped the spent sulfuric acid free of nitric acid in column 10. Some energy will therefore have to be supplied elsewhere in the sulfuric acid loop, for example through a reboiler in the vacuum flash concentrator. The advantage of supplying the energy at that alternative location is that low pressure steam (which may be waste steam) can be used; the increase in the energy requirements of this process option, which comes from the "live steam" injection, may therefore be offset by the savings associated with the elimination of high pressure steam, particularly in case of small plants.

In another modification of the processes of the invention it is possible to inject into the sulfuric acid loop a slip stream of sulfuric acid from another source which may also contain some nitric acid or a stream of strong sulfuric acid that is incidentally available, at the same time purging an equivalent amount of the reconcentrated "strong" sulfuric acid to maintain the necessary inventory. Such a scheme is of advantage if, for example, a waste stream of spent sulfuric acid from a nitration process is available and is to be denitrated. In case such an acid is to be blended into the process its feed location into the column will be dictated by its composition, in that it may be possible to use it to form the acid mixture injected by the nozzles 30 into section 3, or instead it may be necessary to introduce it into section 5 to be reboiled.

It will be noted that the volume of reconcentrated sulfuric acid used in my process is sufficiently large for it to be capable of absorbing all of the energy carried by the water vapor that is vaporized with the "weak" nitric acid in the column and in the nitric acid vaporizer, and it therefore constitutes the principal heat sink of the process. On the other hand, the inventory of sulfuric acid required is relatively small in that its quantity only needs to be sufficient to wet the packing in the column, to fill all the piping, and to ensure that there is an adequate level in the sulfuric acid pump tank 64. The mass ratio of the strong nitric produced to that of the circulation rate of the "strong" sulfuric acid in circulation should be between about 7:1 and 15:1, the ratio depending of course upon the feed "weak" nitric acid strength. As a specific example, when using "strong" sulfuric acid of 75.2% $H_2SO_4$ as the dehydrating agent as described and using "weak" nitric acid of 64% strength the mass ratio will be about 10:1. The relatively low strength of the sulfuric acid used in the process and the relatively small variation in its strength within the sulfuric acid loop of only about 3.2 percentage points also minimizes losses of sulfuric acid from the loop in the form of vapor. This is due to the low partial pressure of sulfuric acid at the acid strengths used in the process. The flow rate of the sulfuric acid is matched to the energy input as described above and, for example, for each kilogram of "strong" nitric acid of produced the pump 48 must circulate about 7 to 15 kilograms of reconcentrated "strong" sulfuric acid, depending on the strength of the "weak" feed nitric acid. Low pressure steam can be employed in nitric acid vaporizer 20, since its heating temperature needs only to be somewhat higher than the boiling point of the feed "weak" nitric acid. If live steam is used in the bottom of column 10 it can be supplied at any convenient temperature, and superheating of this steam is not required.

I claim:

1. A process for an integrated concentration of nitric acid and reconcentration of a dehydrating agent, said process comprising the steps of:
    (a) splitting a feed stream of an aqueous solution of weak nitric acid to be concentrated to result in a larger fraction and a smaller fraction;
    (b) vaporizing at least the larger nitric acid fraction to result in a larger nitric acid vapor fraction;
    (c) directly contacting the larger nitric acid vapor fraction with a first portion of the dehydrating agent in a column to bind the water therefrom and result in a concentrated vapor stream of nitric acid and a diluted stream of said first portion of the dehydrating agent;

(d) mixing the smaller fraction of the weak nitric acid and a second portion of the dehydrating agent;

(e) contacting the concentrated vapor stream of nitric acid in the column with the mixture resulting from step (d) to result in a more concentrated vapor stream of nitric acid and a diluted stream of said second portion of the dehydrating agent;

(f) condensing the more concentrated nitric acid vapor stream from step (e) to obtain a condensed more concentrated nitric acid;

(g) boiling the diluted streams of said first and second portions of the dehydrating agent from steps (c) and (e) to remove nitric acid therefrom and to produce spent dehydrating agent; and (h) collecting, reconcentrating and recirculating the spent dehydrating agent of step (g) for use in steps (c) and (d).

2. The process as claimed in claim 1, wherein the dehydrating agent is an aqueous solution of sulfuric acid or of magnesium nitrate.

3. The process as claimed in claim 1, including the further step of:

(i) contacting the more concentrated vapor stream of nitric acid from step (e) with a third portion of the dehydrating agent to remove part of residual water vapor from said more concentrated vapor stream of nitric acid to result in a still more concentrated vapor stream of nitric acid.

4. The process as claimed in claim 3, including the further step of:

(j) refluxing the condensed more concentrated nitric acid from step (f) to contact said still more concentrated vapor stream of nitric acid of step (i) to collect part of residual water vapor from the still more concentrated vapor stream of nitric acid and of part of the third portion of the dehydrating agent carried in the still more concentrated vapor stream of nitric acid.

5. The process as claimed in claim 2, wherein the spent dehydrating agent of step (g) is reconcentrated in a vacuum equilibrium flash concentrator.

6. The process as claimed in claim 5, further including injecting an alkaline solution into a condensed water loop to neutralize remaining nitric acid and sulfuric acid that enter the water loop through carry-over in the vacuum equilibrium flash concentrator.

7. The process as claimed in claim 1, wherein the spent dehydrating agent of step (g) is reconcentrated by extraction of water vapor therefrom in an evaporative cooler concentrator using air.

8. The process as claimed in claim 7, wherein the evaporative cooler concentrator includes a scrubber, and the water vapor extracted from the reconcentrated dehydrating agent is neutralized by injection of an alkaline solution into the scrubber.

9. The process as claimed in claim 1, wherein the dehydrating agent is sulfuric acid and the strength of the reconcentrated sulfuric acid from step (h) is between 71% and 79% by weight.

10. The process as claimed in claim 9, wherein the strength of the reconcentrated sulfuric acid is about 75.2% by weight.

11. The process as claimed in claim 1, wherein the dehydrating agent is sulfuric acid, wherein part of the reconcentrated sulfuric acid from step (h) is mixed with the spent sulfuric acid from step (g), and wherein this mixture of reconcentrated and spent sulfuric acid is transferred through a sulfuric acid transfer line to a vacuum equilibrium flash concentrator such that flashing in the sulfuric acid transfer line is avoided.

12. The process as claimed in claim 1, wherein the feed stream of step (a) is preheated by the condensing more concentrated nitric acid vapor of step (f).

13. The process as claimed in claim 1, wherein the larger vapor fraction of step (a) is vaporized by passing through a vaporizer using low pressure steam as the heat source.

14. The process as claimed in claim 1, wherein the boiling of the diluted stream of the first and second portions of the dehydrating agent in step (g) is effected use of a high pressure steam reboiler in the column.

15. The process as claimed in claim 1, wherein the energy input to a reboiler boiling the dehydrating agent in step (g) is controlled.

16. The process as claimed in claim 1, wherein live steam is injected into the bottom of the column to produce the boiling of step (g).

17. The process as claimed in claim 1, wherein at least steps (c), (e), (g) and (i) are effected in a single column and the reconcentrated dehydrating agent is recirculated to the column in three portions at three separate locations to be used in steps (c), (e) and (i).

18. The process as claimed in claim 1, wherein the dehydrating agent is sulfuric acid and wherein the proportions of the sulfuric acid and the smaller fraction of feed nitric acid in step (d) are such that a nitric acid vapor in equilibrium with the resulting mixture has a strength of 85% to 96% $HNO_3$.

19. The process according to claim 1, wherein the dehydrating agent is sulfuric acid and wherein the energy is supplied through boiling tubes in a sulfuric acid loop in which the sulfuric acid is reconcentrated.

20. A process according to claim 1, wherein the dehydrating agent is sulfuric acid and wherein the mass ratio of the condensed more concentrated nitric acid produced in step (f) to a mass circulation rate of the dehydrating agent is between 7:1 and 15:1.

* * * * *